Jan. 22, 1963     I. I. TUBBS     3,074,454
TIRE
Filed Oct. 21, 1960
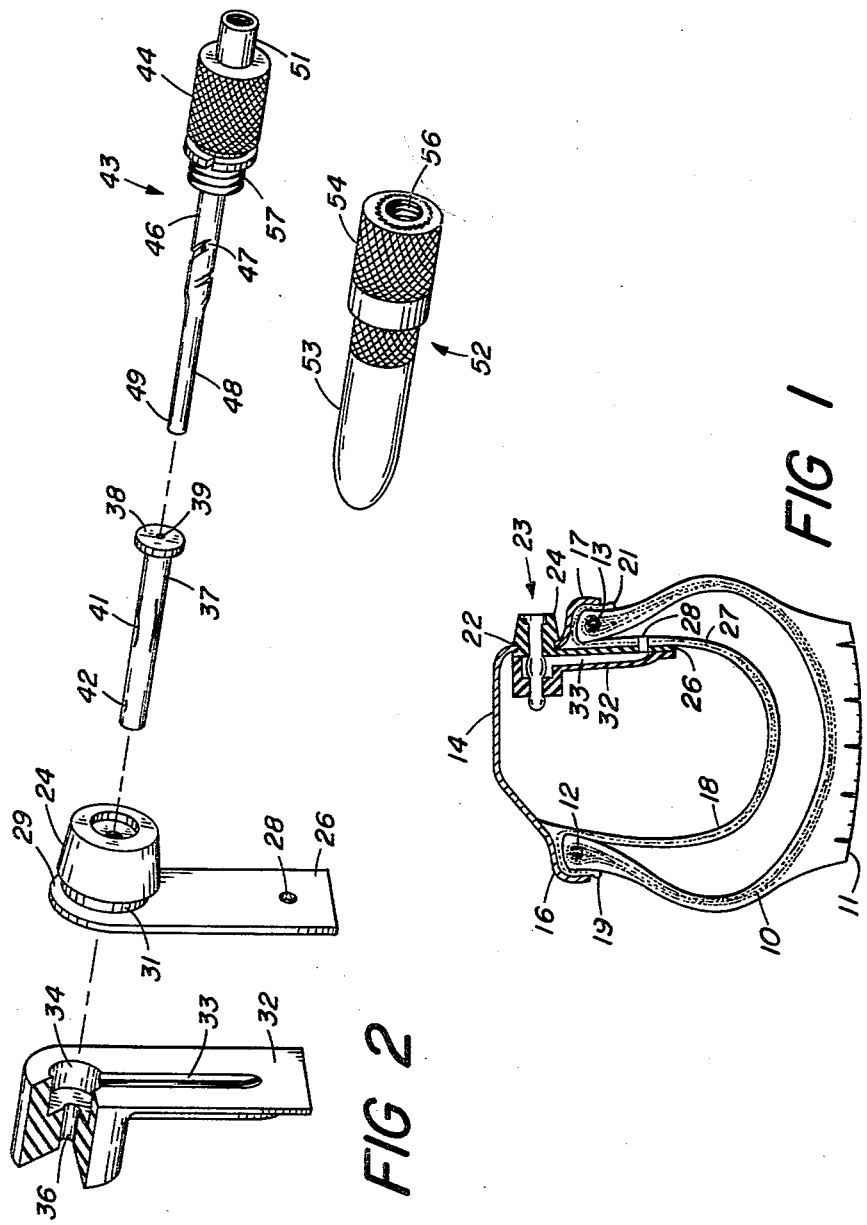
INVENTOR.
IRL I. TUBBS
BY *Marvin Moody*
ATTORNEY

United States Patent Office 3,074,454
Patented Jan. 22, 1963

3,074,454
TIRE
Iri I. Tubbs, 849 N. Central Ave., Galva, Ill.
Filed Oct. 21, 1960, Ser. No. 64,135
3 Claims. (Cl. 152—341)

This invention relates in general to tires, and in particular to a novel valve and system which allows a two-chambered tire to be inflated simultaneously.

As autos and trucks are driven faster and faster terrific strains are placed on tires, and even though tires are made strong, they at times will blow out or fail otherwise while being driven at high speeds. One safety device provides an inner liner in the tire which forms a second cavity so that in the event the outer casing fails the inner liner will support the vehicle until a safe stop is executed. As a matter of fact, inner liners exist which are capable of supporting the vehicle while being driven 200 miles or more. Such liners have eliminated the spare tires on many new vehicles, so that at least one of the major auto makers of America gives only four tires as standard equipment with nine-passenger station wagons. This eliminates the requirement for a spare tire storage chamber and gives more room in the vehicle. Prior inner liners have been inflated with a separate valve from the one used to inflate the chamber between the liner and the tire.

It is an object of the present invention, however, to provide an improved tire and inner liner with a composite valve and inflating tool that can be simultaneously inflated.

Another object of this invention is to provide an improved tire, liner, and valve structure which has only one inflating opening.

A feature of this invention is found in the provision for an improved valve and core structure for a two chambered tire wherein both chambers may be simultaneously inflated or deflated through a common opening.

Further objects, features, and advantages of this invention will become apparent from the following description and claims when read in view of the drawings, in which:

FIGURE 1 is a sectional view of the double chambered tire according to this invention, and FIGURE 2 is an exploded view of the valve casing, core, and inflating tool of this invention.

FIGURE 1 illustrates a conventional tire 10 of the tubeless type which has tread 11 and rim gripping beads 12 and 13 which are received in edges 16 and 17 of the rim 14.

An inner liner 18 is mounted within the tire 10 and has edges 19 and 21 which extend over beads 12 and 13 of the tire and are clamped by portions 16 and 17 of the rim.

Thus, the inner liner 18 divides the tire chamber into two portions—an external chamber between the liner end the inside of the tire casing, and an inner chamber between the liner and the rim. Such a construction provides a safety feature in the event of a blowout or other failure of the outer casing, in that the inner liner will support the vehicle for a substantial period. Such an inner liner and tire combination is not novel per se; however, the present invention relates to a novel valve and combination for simultaneously inflating or deflating both chambers.

The rim 14 is formed with an opening 22 through which the valve 23 of this invention extends. The valve 23 is made of rubber or other resilient material and comprises an outer portion 24 which extends out of opening 22. As best shown in FIGURE 2, a reduced cross sectional neck 31 adjoins portion 24. A radially outwardly extending portion 26 extends from neck 31. An opening 28 is formed through portion 26. The radially outwardly extending portion is attached to the inside of inner liner 18 at the side 27 adjacent the rim side 17 and opening 28 extends through the inner liner 18 and portion 26.

A second radially outwardly extending portion 32 is formed with a groove 33 and is molded or otherwise attached to portion 26. Portion 32 has upper end formed with a central opening 36 which communicates with a recess 34.

A valve core 37 is received in an opening through portion 24, collar 31, the top 29 of member 26, recess 34, and opening 36. The core has a head 38 and a central opening 39. Slits 41 are formed in the core near its center and communicate with the central opening 39. Slits 41 are mounted within recess 34 when the unit is assembled. A slit 42 is formed in the core adjacent the inner end which extends through the central slit and opening 36. Slit 42 communicates with the central opening 39 of the core.

An inflating needle 43 has a knurled holding portion 44 and an air hose adapter 51. A central opening through the needle extends into an enlarged portion 46 which is formed with grooves 47 that communicate with the central opening of the needle. A smaller portion of the needle 48 is formed with openings 49 adjacent its end.

A storage cap 52 has a cylindrical portion 53 and an enlarged portion 54. The end 56 is threaded to mate with threads 57 on the needle 43.

Lubricating material such as oil-soaked cotton can be kept in the cap 52 to keep the needle lubricated to facilitate easy insertion into the valve core.

In use the needle 43 is inserted into the valve core opening 39 until the threaded portion 57 abuts against the cap 38 of the core. In this position the grooves 47 align with slits 41 in recess 34 and the end 48 of the needle passes out opening 42 in the end of the core. The core, being resilient, conforms to the shape of the needle.

The outer chamber will be inflated when air is connected to the needle by passing through the central opening of the needle, out the grooves 47, through slits 41 which are opened by the needle, from recess 34 through groove 33 and through opening 28 to the outer chamber. Simultaneously, air will pass through the needle and out of opening 49 into the inner chamber of the tire.

Thus there is provided a combination valve and needle for simultaneously inflating both chambers. The sizes of the openings of the needle and valve are such that the proper volume of air is received in each chamber.

After inflation the needle is withdrawn and returned to its case. The air does not leak between chambers or to the outside because the opening 36 is small enough to compress the resilient core 37 when the needle is removed and the neck 31 and body 24 compresses and seals the core between slits 41 and the outside due to the core's resiliency when the needle is removed. The needle, of course, deforms and opens these portions when inserted.

Thus, the present invention provides a unique double valve and inner liner which allows a single needle to simultaneously inflate two chambers of a tire.

Although the invention has been described with respect to a preferred embodiment thereof, it is not to be so limited, as changes and modifications may be made therein which are within the full intended scope of the invention as defined by the appended claims.

What is claimed is:

1. A double chambered tire and rim combination comprising a flexible tire, a rim and an inner liner, an opening formed through the rim, a valve structure with a portion extending through the opening in the rim, a central opening formed through the valve structure, a radially outwardly extending portion of the valve structure attached to the inner liner, a passage extending from one side of the inner liner through the radially outwardly extending portion and communicating with the central opening, the central opening communicating with the other side of the inner liner, and a flexible valve core forming a portion of the valve structure and mounted in the central opening and formed with a first slot adjacent its end on the other side of the inner liner and a second slot formed in the core adjacent the junction between the passage from one side of the inner liner and the central opening.

2. A double chambered tire comprising a tire, a rim and an inner liner, an opening formed in the rim, a flexible valve structure with a portion extending through the opening in the rim, a flexible valve core adapted to receive an inflating device and mounted in a central opening of the valve structure and extending through the central opening to communicate with both sides of the rim and having a central opening and a first slot intermediate its ends and a second slot adjacent its inner end, the first and second slots in communication with the central opening of the core, a radially outwardly extending portion of the valve structure attached to the inner liner and formed with a passage which communicates with the central opening of the valve structure and the chamber formed between the tire and the inner liner, the opening in the rim being of a size to compress the flexible valve structure and core to provide an air seal, and a portion of the flexible valve structure adjacent the inner end of the core compressing and sealing the central passage of the core.

3. A double chambered tire according to claim 2 wherein said inflating device comprises an inflating needle formed with a longitudinal portion receivable through the central opening of the core and out the second slot, an opening formed in the end of the needle and in communication with a central inflating passage of the needle, and a second opening formed in the needle intermediate its ends and in communication with the central inflating passage and in alignment with the first slot of the valve core to allow inflation or deflation of the chamber between the tire and inner liner when the needle is inserted into the valve structure.

References Cited in the file of this patent
UNITED STATES PATENTS

| | | |
|---|---|---|
| 575,430 | Savoie | Jan. 19, 1897 |
| 2,295,457 | Eberhard | Sept. 8, 1942 |
| 2,934,127 | Howard | Apr. 26, 1960 |